(No Model.)
G. A. DUMBECK.
ANIMAL TRAP.
No. 525,141. Patented Aug. 28, 1894.
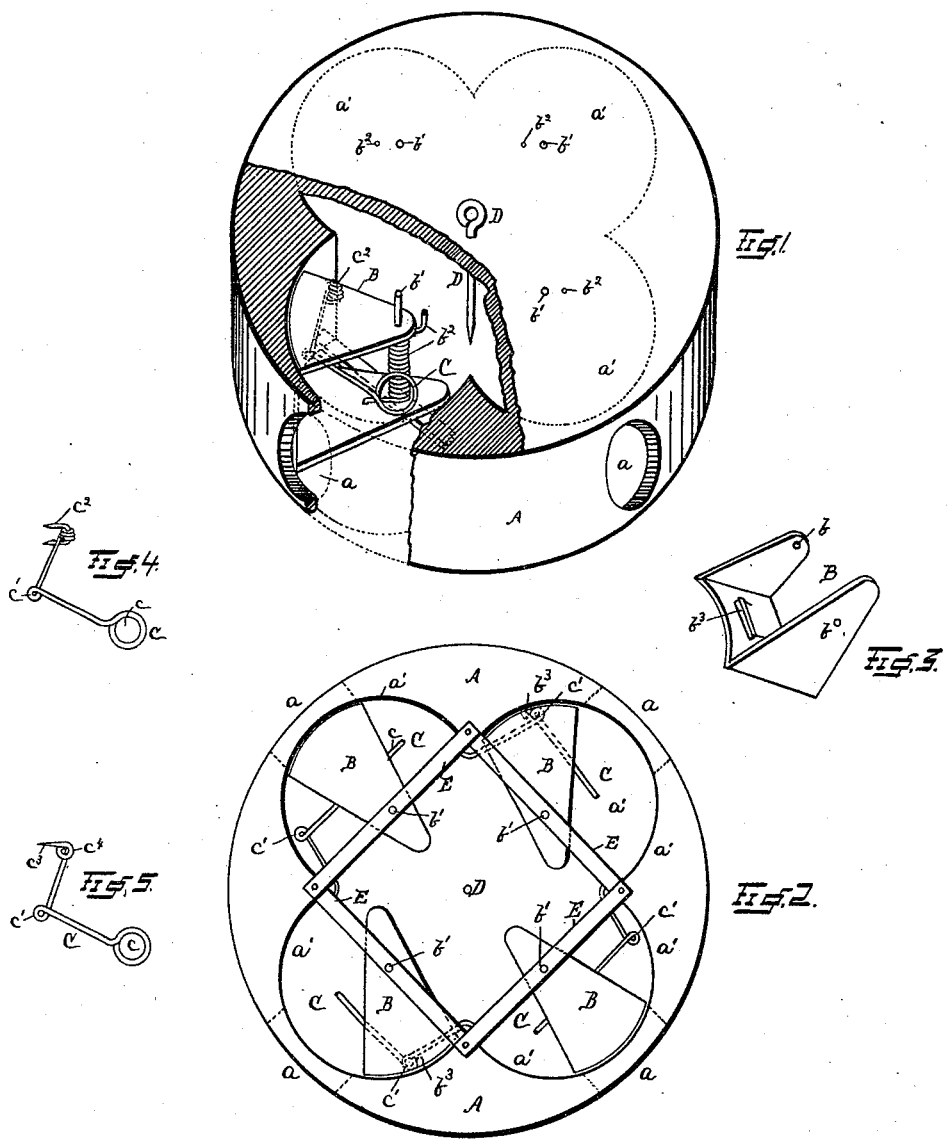
Witnesses
Wm Marks, Jr.
H. C. Lind
Inventor
Gustav A. Dumbeck
By Attorneys
Hallock & Halleck

UNITED STATES PATENT OFFICE.

GUSTAV A. DUMBECK, OF ERIE, PENNSYLVANIA.

ANIMAL-TRAP.

SPECIFICATION forming part of Letters Patent No. 525,141, dated August 28, 1894.

Application filed January 13, 1894. Serial No. 496,749. (No model.)

*To all whom it may concern:*

Be it known that I, GUSTAV A. DUMBECK, a citizen of the United States, residing at Erie, in the county of Erie and State of Pennsylvania, have invented certain new and useful Improvements in Animal-Traps; and I do hereby declare the following to be a full, clear, and exact description of the invention, such as will enable others skilled in the art to which it appertains to make and use the same.

This invention relates to animal traps and consists in certain improvements therein, as will be hereinafter fully set forth and pointed out in the subjoined claims.

The particular class or type of animal traps to which my invention more specially relates is commonly called choker-trap.

My invention is illustrated in the accompanying drawings as follows:

Figure 1 is a perspective view with parts broken away to show construction. Fig. 2 is a plan view of the under side of the trap. Fig. 3 is a perspective view of one of the chokers removed from the trap. Fig. 4 is a view of one of the triggers removed from the trap. Fig. 5 is a like view to Fig. 4 showing a modification in the construction of the trigger.

Choker traps are commonly made with a body of wood often in the form of a disk, which is bored out on the under side to form separate compartments to each of which compartments is adjusted a separate trap, and on the side are bored holes entering each compartment. Sometimes these traps are made with pressed sheet metal bodies, with a series of openings with each of which is connected a trap.

Heretofore, so far as I am aware the chokers have been made of wire in the form of a loop and they act vertically and catch the animal under the neck.

In my device the chokers are shown as made of sheet metal, (but it is not essential) and they act horizontally and they catch the animal on the side of the neck and not upwardly from below.

I have represented my improvements as applied to a body formed of wood and having four separate traps contained therein, but I do not intend to be limited in this regard, for my improvements can be applied to various forms of bodies.

In the accompanying drawings, A marks the body of the trap. It contains a cavity within that is formed by four auger borings $a'$ $a'$ $a'$ $a'$ and to this compartment are four entrances $a$ $a$ $a$ $a$.

B, marks the chokers, of which there are one for each of the openings $a$, and they are each adjusted within one of the four borings $a'$, which form the inner compartment, and in the center of this compartment is a bait holder D, which serves for all the four traps. The chokers B, are pivoted on posts $b'$, which pass through the pivot holes $b$ in the chokers. Coiled springs $b^2$ are adjusted upon the pins or posts $b'$ and connected with the choker B, so as to throw them into action when released by the triggers.

In Fig. 1 the choker B, is shown as "set." In Fig. 2 two of the chokers are shown as "set" and two as "sprung."

C, marks the triggers. This part consists preferably, of a wire having a loop $c$ at one end, an angle is bent near the middle so as to give the trigger an L form and at this angle is located a kink forming a sort of lug or knob $c'$, and at the other end, in the construction shown in Fig. 4, is formed an eye which receives a staple $c^2$, by which the trigger is attached, pivotally, to the wall of the inner compartment, while in Fig. 5, at this inner end of the trigger there is formed a coil spring $c^4$, and a point $c^3$, by which the trigger can be attached to the body A and in place of being pivoted it will swing by means of the spring coil $c^4$.

When the chokers are "set" the knob $c'$ on trigger C engages a lug $b^3$ on the choker and holds the choker in a "set" position. When the parts are thus engaged the loop $c$ of the trigger stands directly in front of the entrance $a$, and between said entrance and the bait on the bait holder D, and the animal in attempting to reach the bait will press upon the trigger and dislodge the knob $c'$ from its engagement with the lug $b^3$ and the spring $b^2$ will drive the choker against the animal and hold it fast within the entrance hole $a$.

E, in the drawings marks stay strips which hold the lower ends of the pivot posts $b'$.

When the chokers are made of sheet metal, as shown, they are cut and stamped into form by dies and the lug $b^3$ is formed by an indentation of the metal.

The object in forming one arm of the choker longer than the other is to afford a handle by which the choker can be moved back against the action of the spring $b^2$, as in "setting" the trap.

When the trigger is made as in Fig. 4, that is when it is pivoted, it is necessary, when setting a choker to so hold the trap that the trigger will fall by gravity against the choker and engage the lug $b^3$. This position is secured by holding the trap edgewise and with the choker being set at the lowest point. If the trigger is made as in Fig. 5 it will engage the lug $b^3$ whenever the choker is drawn back regardless of the position in which the trap is held. In either case the operation of "setting" the trap is very simple and easily accomplished, which is a great advantage. Besides this there are several other points of advantage secured by my construction as follows:

The working parts of the trap are all contained within it and there are no outer riggings to be injured by packing, shipping or when using the trap.

When all the chokers are "set" there is a clear view through the trap, and this may be the case when only two of the chokers are set. The animal will be more easily persuaded to enter the trap if it can see an opening beyond. This also enables the use of only one bait for the entire complement of chokers.

When any choker of the series is not set it acts as a gate and closes the opening to which it is associated and there can be no point of free access to the bait. In all ordinary choker traps when the choker is not set, the bait is exposed to the free and safe access of the animals, but in my construction this is not so because, as above stated, the "sprung" chokers close their associated openings.

A choker trap like that shown in the drawings, having a multiplicity of chokers, and a body made of wood can be produced cheaper than a common choker trap of the same capacity, because the disk of wood may be of less diameter, thus saving timber; there are fewer holes to be bored to prepare the block, thus saving time; the trap riggings contain fewer pieces and can be produced with less labor and material and the adjustment of the riggings to the block can be effected quicker.

When completed, my trap can be packed into nearly one half less space than traps of the same class having the trap riggings mostly on the top of the trap, as commonly.

What I claim as new is—

1. In an animal trap, the combination with a trap-body, having a single compartment therein, and a series of entrance passages to said compartment in the vertical walls of said body, of a series of spring-actuated chokers, contained within said compartment and which move across said passages in a plane at right angles to the vertical axis of said body, and a centrally placed bait holder, that is visible through each of said passages.

2. In an animal trap, the combination with a trap-body, having an entrance passage, of a spring-actuated choker which when unset serves as a gate to close said passage.

3. In an animal trap, the combination with a trap-body, having an entrance passage, of the horizontally-swinging spring-actuated choker B, that acts to close said entrance passage.

4. In an animal trap, the combination with a trap-body, having an entrance passage, of the horizontally-swinging spring-actuated choker B, having a trigger catch thereon, and the trigger C for engaging said choker which extends into position to be contacted by the animal as it attempts to enter the trap.

In testimony whereof I affix my signature in presence of two witnesses.

GUSTAV A. DUMBECK.

Witnesses:
JNO. K. HALLOCK,
J. P. SLOCUM.